Patented May 15, 1945

2,375,755

UNITED STATES PATENT OFFICE 2,375,755

LEAD BASE ALLOY AND CABLE SHEATH COMPOSED THEREOF

William H. Bassett, Jr., Scarsdale, and Clermont J. Snyder, Hastings on Hudson, N. Y., assignors to Anaconda Wire and Cable Company, a corporation of Delaware No Drawing. Application October 11, 1941, Serial No. 414,648

4 Claims. (Cl. 75—166)

This invention relates to lead base alloys, and is concerned especially with the provision of a new and improved lead base arsenic-bearing alloy especially suitable for use as a cable sheath material. The invention also contemplates the provision of a cable of the lead-sheathed type having a sheath formed of the new lead base alloy. Further, the invention provides a novel method for heat-treating lead base alloys containing arsenic to increase or decrease the hardness thereof, and otherwise to improve the alloys.

Many electric cables of the lead-sheathed type contain oil as an insulating medium. In some such cables a channel is formed to permit the oil to flow freely in the cable, whereas in others the oil is impregnated into a solid but permeable insulation such as paper and so is relatively less free to flow in the cable. In all such cables, however, the oil can flow to some extent, and consequently when such cables are run vertically or at an angle to the horizontal, a hydrostatic pressure of oil develops in the lower part of the cable. This pressure must be resisted by the lead or lead alloy sheath. Commercially pure lead, and lead alloys formerly available, have not proven very effective in resisting the hydrostatic pressure of the oil, especially in installations where such pressures are of considerable magnitude. On the contrary, cable sheaths of lead and lead alloys formerly available have been subject in greater or lesser degrees to distension under prolonged, steadily exerted hydrostatic oil pressures, and many cases are known where the lead sheath ultimately has burst, ruining the cable.

In the copending application of Gunnard E. Johnson and William H. Bassett, Jr., Serial No. 370,006, filed December 13, 1940, assigned to the same assignee as this application, it is pointed out that if the sheath of an oil-containing cable is formed of a lead base alloy containing arsenic and bismuth in certain proportions, the bursting strength of the sheath is very much increased over that of sheaths formed of commercially pure lead or previously known lead base alloys. The Johnson and Bassett application describes cable sheaths of increased bursting strength made of lead base alloys composed of about 0.02% to 1% (particularly 0.1% to 0.2%) arsenic, about 0.02% to 1% (particularly 0.07% to 0.2%) bismuth, and the balance substantially all lead. (These percentages and others given elsewhere in this specification and in the appended claims are by weight of the alloy.)

We have found that lead base alloys containing arsenic and bismuth, of the character described in the aforementioned Johnson and Bassett application, are subject to annealing, with loss of hardness and tensile strength and particularly with loss of bursting strength in the case of cable sheaths made thereof, if the alloy is heated to temperatures of the order of 50° C. to 200° C. Cable sheaths may become heated to the lower temperatures within this range during heavy service, and quite commonly are subjected to the higher temperatures in this range when separate lengths are joined together. Joints usually are made by heating the sheath and joining by the well known method of producing wiped lead joints. Such heating of a sheath of a lead alloy containing bismuth and arsenic results in a relatively soft section of relatively low tensile and bursting strengths adjacent to the joint.

We have discovered that if certain metals are incorporated in lead base alloys containing arsenic and bismuth, the annealing temperature of the alloy is considerably increased. Wiped joints may be made in cable sheaths made of such modified alloys without unduly softening the sheath or lessening its tensile and bursting strengths adjacent the joints. The metals which we have found to possess the property of thus improving lead alloys containing arsenic and bismuth are tin, cadmium, and zinc.

Based on this discovery, our invention contemplates the provision of an improved lead base alloy, and a cable sheath made therefrom, composed of about 0.02% to 1% arsenic, about 0.02% to 1% bismuth, about 0.01% to 1% of a metal selected from the group consisting of tin, cadmium and zinc, and the balance substantially all lead. The desired properties of high tensile and bursting strengths and high annealing temperature are particularly well-developed in alloys (and in cable sheaths made therefrom) composed of about 0.1% to 0.2% arsenic, about 0.07% to 0.2% bismuth, about 0.05% to 0.25% of the metal selected from the group consisting of tin, cadmium, and zinc, and the balance substantially all lead.

In the course of our investigations we have further discovered that in general lead base alloys containing an amount of arsenic of the order of 0.02% to 1% are heat-treatable for hardening or softening by a procedure which is quite unusual in the case of non-ferrous metals. Thus, we have discovered that soft arsenic-bearing lead alloys may be hardened appreciably by heating to an elevated temperature approaching but not exceeding the melting point, and then quenching, and that hard alloys of this character may be softened by heating to a relatively low note and then quenching in water. The letter preceding each hardness number in the columns headed "Hardened" refers to the particular footnote giving the heat treatment.

*Table I*

| Per cent As | Per cent Bi | Per cent Sn | Per cent Cd | Per cent Zn | Original | | Annealed [1] | | Hardened | |
|---|---|---|---|---|---|---|---|---|---|---|
| | | | | | C. | F. | C. | F. | C. | F. |
| 0.15 | | | | | 82 | 106 | 56 | 73 | a 134 | a 143 |
| 0.15 | 0.17 | | | | 109 | 119 | 66 | 79 | b 140 | b 146 |
| 0.15 | 0.17 | 0.05 | | | 111 | 130 | 134 | 123 | a 151 | a 142 |
| 0.15 | 0.17 | 0.15 | | | 114 | 141 | 142 | 136 | a 156 | a 155 |
| 0.15 | 0.17 | 0.25 | | | 117 | 149 | 146 | 139 | a 150 | a 144 |
| 0.15 | 0.17 | 0.50 | | | 125 | 145 | 130 | 104 | a 144 | a 119 |
| 0.15 | 0.17 | 1.0 | | | 129 | 126 | 121 | 98 | a 146 | a 127 |
| 0.15 | 0.17 | | 0.01 | | 103 | 139 | 102 | 120 | a 123 | a 129 |
| 0.15 | 0.17 | | 0.10 | | 109 | 155 | 133 | 107 | a 132 | a 130 |
| 0.15 | 0.17 | | 0.15 | | 118 | 148 | 137 | 111 | a 131 | a 128 |
| 0.15 | 0.17 | | 0.25 | | 127 | 140 | 142 | 129 | a 135 | a 133 |
| 0.15 | 0.17 | | 0.50 | | 112 | 132 | 111 | 97 | a 117 | a 126 |
| 0.15 | 0.17 | | | 0.01 | 108 | 121 | 106 | 88 | b 146 | b 149 |
| 0.15 | 0.17 | | | 0.05 | 113 | 146 | 103 | 86 | b 148 | b 155 |
| 0.15 | 0.17 | | | 0.10 | 106 | 148 | 97 | 82 | b 152 | b 154 |
| 0.15 | 0.17 | | | 0.25 | 100 | 149 | 102 | 89 | b 150 | b 154 |
| 0.15 | 0.17 | | | 0.50 | 112 | 149 | 78 | 93 | b 141 | b 153 |

[1] All samples annealed by heating 19 hours at 100° C. and then cooling slowly in air.
a—Hardened by heating 4 hours at 205° C. and quenching in water.
b—Hardened by heating 6 hours at 260° C. and quenching in water.
c—Hardened by heating 4 hours at 260° C. and quenching in water.
d—Hardened by heating 24 hours at 260° C. and quenching in water.

temperature (about 50° C. to 200° C.) and then cooling slowly. Heat-treatable non-ferrous alloys generally behave quite differently, being annealed by heating to a rather high temperature and quenching, and being age-hardened by heating for a considerable period at a relatively low temperature.

Based on this discovery, the invention further provides an improved method for heat-treating a lead base alloy comprising an amount of arsenic of the order of 0.02% to 1% to increase the hardness thereof, which comprises heating the alloy to a temperature approaching but not equalling its melting point. Advantageously this heating is for a number of hours at a temperature in the range 250° C. to 300° C. The heated alloy is then quenched, advantageously in water but if desired in some other quenching medium such as oil or an air blast. The invention further provides a method for heat-treating hard lead base alloys containing arsenic in an amount of the order of 0.02% to 1% to decrease the hardness thereof, which comprises heating the alloy to a temperature in the range 50° C. to 200° C. (advantageously in most cases for a number of hours in the range 80° C. to 200° C.), and then cooling the alloy slowly, either in still air or in a furnace.

The improved properties of the alloys provided in accordance with the present invention are indicated in Table I. The several alloys listed in Table I contained the various alloying elements in the percentages given, the balance of the alloy in each case being substantially all lead. The figures given in the table denote hardness of the alloy as determined on the Rockwell scale, using a one-half inch ball under a sixty kilogram load for thirty seconds. The letters "C" and "F" designate respectively cast test specimens and forged test specimens. The figures in the columns headed "Original" give the hardness of the cast and forged specimens before heat-treatment. The figures in the columns headed "Annealed" give the hardness of the test specimens after heating for nineteen hours at 100° C. and then cooling slowly in air. The figures in the columns headed "Hardened" give the hardness of the test specimens after heating at the temperature and for the time indicated in the footnote and then quenching in water. The letter preceding each hardness number in the columns headed "Hardened" refers to the particular footnote giving the heat treatment.

It will be noted from Table I that lead alloyed with arsenic alone, or with arsenic and bismuth without other additions, become appreciably softened by the annealing procedure (at only 100° C.). The alloys containing tin or cadmium in addition to arsenic and bismuth, on the other hand, softened but very little when subjected to the same annealing procedure. The alloys containing zinc in addition to arsenic and bismuth softened to a small extent during annealing but the cast samples particularly were definitely superior in this respect to the alloys of lead with arsenic alone or with only arsenic and bismuth.

It will be noted that in general the resistance of the alloys to softening when annealed is well developed with from 0.5% to 0.25% of tin, cadmium, or zinc in the alloy.

Hardness by itself is not a measure of the bursting strength of a lead alloy formed into a cable sheath. However, alloys having very good bursting strengths, such as the alloys of lead containing arsenic and bismuth described in the aforementioned Johnson and Bassett application, suffer a decrease in bursting strength roughly in proportion to the decrease in hardness when annealed. The bursting strength when formed into a given size cable sheath is approximately the same for all but the first of the "Original" and "Hardened" alloys listed in Table I (the first listed bismuth-free alloy has a somewhat lower bursting strength than the bismuth-bearing alloys). The alloys to which tin, cadmium, or zinc has been added retain their bursting strength better after being subjected to annealing temperatures than do the alloys containing none of these additions.

Table I also shows the susceptibility of arsenic-bearing lead alloys generally to be hardened or softened by appropriate heat treatment. As indicated in the table, the alloys may be hardened appreciably by heating to an elevated temperature upwards from 200° C., preferably for a number of hours, and then quenching. Quenching most advantageously is accomplished with water, but other quenching media such as oil or a blast of air may be employed.

Table I also indicates that the alloys may be softened appreciably by heating, preferably for a number of hours, at a relatively low temperature and then cooling slowly. The alloys containing tin, cadmium and zinc do not soften very much at the lower annealing temperatures in the neighborhood of 100° C. (which is a desirable attribute for maintaining high bursting strength in the vicinity of wiped joints or at other heated sections of a cable sheath). These alloys may be softened, however, by annealing at a higher temperature.

The response of arsenic-bearing lead alloys to this type of heat treatment is unusual for non-ferrous alloys. Such alloys generally are softened by heating to a relatively high temperature and cooling rapidly, and are age-hardened by reheating to a relatively low temperature for a considerably period of time.

The susceptibility of arsenic-bearing lead alloys to softening and hardening at various heat treatment temperatures is indicated in Tables II and III. Table II gives the hardness on the Rockwell scale (determined by using a one-half inch ball under a sixty kilogram load for thirty seconds) of cast and forged test specimens of a binary arsenic-lead alloy and ternary arsenic-tin arsenic-cadmium lead alloys after annealing the alloys at the temperatures indicates for twenty-four hours and then cooling slowly. Table III gives the Rockwell hardness (determined in the same manner) of cast and forged test specimens of the same alloys after hardening by heating for six hours at the temperature indicated and quenching in water. In each of Tables II and III the letters "C" and "F" designate respectively cast test specimens and forged test specimens.

100° C. and 200° C., and the temperatures from which these alloys should be quenched for developing maximum hardness is correspondingly higher, being upwards of 250° C. Thus, the influence of tin and cadmium in increasing the annealing temperature of arsenic-bearing lead alloys is apparent even in the absence of bismuth. The bismuth, however, is a desirable addition to lead base alloys intended for use as cable sheaths, as the bismuth increases the tensile strength and hardness of the alloy and materially enhances its bursting strength. The addition of small amounts of bismuth to any of the alloys listed in Tables II and III does not substantially alter the response of the respective alloys to the various heat treatments given. Thus the addition of a small amount of bismuth to the binary arsenic-lead alloy of these tables produces a ternary alloy which is annealed at about the same temperatures and hardened by quenching from about the same temperatures as the binary alloy. Similarly the addition of a small amount of bismuth to the ternary alloys of Tables II and III produces quaternary alloys which are annealed or hardened by substantially the same heat-treatment at substantially the same temperatures as the corresponding bismuth-free ternary alloy.

We claim:

1. A lead base alloy composed of 0.02% to 1% arsenic, 0.02% to 1% bismuth, 0.01% to 1% tin, and the balance substantially all lead.

2. A lead base alloy composed of 0.01% to 0.2% arsenic, 0.07% to 0.2% bismuth, 0.05% to 0.25% tin, and the balance substantially all lead.

3. A cable of the lead-sheathed type having a

*Table II*

| Per cent As | Per cent Sn | Per cent Cd | Original sample | Heated 24 hours at temperature indicated and slowly cooled ||||||| 
|---|---|---|---|---|---|---|---|---|---|---|
| | | | | 50° C. | 65° C. | 80° C. | 90° C. | 100° C. | 150° C. | 200° C. |
| 0.15 | -------- | -------- | C. 125 | 109 | 87 | 89 | 67 | 67 | 73 | 80 |
| | | | F. 129 | 119 | 102 | 80 | 87 | 75 | 79 | 88 |
| 0.15 | 0.25 | -------- | C. 146 | 139 | 139 | 133 | 118 | 124 | 121 | 110 |
| | | | F. 142 | 144 | 139 | 121 | 117 | 102 | 103 | 93 |
| 0.15 | -------- | 0.25 | C. 143 | 123 | 129 | 110 | 110 | 101 | 117 | 105 |
| | | | F. 148 | 136 | 119 | 111 | 111 | 107 | 95 | 107 |

*Table III*

| Per cent As | Per cent Sn | Per cent Cd | Original sample | Heated 6 hours at temperature indicated and quenched in water ||||||| 
|---|---|---|---|---|---|---|---|---|---|---|
| | | | | 121° C. | 149° C. | 177° C. | 204° C. | 232° C. | 260° C. | 288° C. |
| 0.15 | -------- | -------- | C. 125 | 100 | 75 | 84 | 94 | 124 | 128 | 158 |
| | | | F. 129 | 111 | 84 | 85 | 100 | 112 | 133 | 165 |
| 0.15 | 0.25 | -------- | C. 146 | 139 | 134 | 139 | 130 | 148 | 145 | 165 |
| | | | F. 142 | 133 | 108 | 110 | 113 | 128 | 139 | 159 |
| 0.15 | -------- | 0.25 | C. 143 | 112 | 112 | 105 | 130 | 132 | 151 | 170 |
| | | | F. 148 | 117 | 106 | 113 | 124 | 134 | 145 | 163 |

Tables II and III show that the softening of the arsenic-lead binary alloy is most pronounced at relatively low annealing temperatures in the neighborhood of 100° C., whereas this alloy does not harden very much unless quenched from a temperature considerably higher and preferably above 200° C. Annealing of the tin-bearing and cadmium-bearing alloys is most pronounced at relatively higher annealing temperatures between sheath formed of an alloy composed of 0.02% to 1% arsenic, 0.02% to 1% bismuth, 0.01% to 1% tin, and the balance substantially all lead.

4. A cable of the lead-sheathed type having a sheath formed of an alloy composed of 0.1% to 0.2% arsenic, 0.07% to 0.2% bismuth, 0.05% to 0.25% tin, and the balance substantially all lead.

WILLIAM H. BASSETT, Jr.
CLERMONT J. SNYDER.

Certificate of Correction

Patent No. 2,375,755. May 15, 1945.

WILLIAM H. BASSETT, JR. ET AL.

It is hereby certified that error appears in the printed specification of the above numbered patent requiring correction as follows: Page 3, second column, line 32, claim 2, for "0.01%" read *0.1%*; and that the said Letters Patent should be read with this correction therein that the same may conform to the record of the case in the Patent Office.

Signed and sealed this 15th day of October, A. D. 1946.

[SEAL]

LESLIE FRAZER,
*First Assistant Commissioner of Patents.*